United States Patent
Muehl et al.

(10) Patent No.: US 7,092,973 B2
(45) Date of Patent: Aug. 15, 2006

(54) CONFLICT DETECTION IN A DISTRIBUTED SYSTEM LANDSCAPE

(75) Inventors: Gordon Muehl, Oestringen (DE); Klaus Irle, Walldorf (DE); Knut Heusermann, Rauenberg (DE); Wolfram Siefke, Heidelberg (DE); Juergen Wieland, Stuttgart (DE)

(73) Assignee: SAP Aktiengesellschaft, Walldorf (DE)

( * ) Notice: Subject to any disclaimer, the term of this patent is extended or adjusted under 35 U.S.C. 154(b) by 329 days.

(21) Appl. No.: 10/328,743

(22) Filed: Dec. 23, 2002

(65) Prior Publication Data

US 2004/0122869 A1    Jun. 24, 2004

(51) Int. Cl.
*G06F 17/30* (2006.01)
(52) U.S. Cl. .................. 707/203; 707/201; 715/511
(58) Field of Classification Search ............... 707/201, 707/203; 715/511
See application file for complete search history.

(56) References Cited

U.S. PATENT DOCUMENTS

| | | | | |
|---|---|---|---|---|
| 5,649,102 A | | 7/1997 | Yamauchi et al. | 709/213 |
| 5,787,262 A | | 7/1998 | Shakib et al. | 709/205 |
| 6,457,065 B1 | | 9/2002 | Rich et al. | 719/328 |
| 6,892,210 B1 | * | 5/2005 | Erickson et al. | 707/201 |
| 2002/0042910 A1 | * | 4/2002 | Baumeister et al. | 717/172 |
| 2002/0087603 A1 | * | 7/2002 | Bergman et al. | 707/517 |
| 2002/0120648 A1 | * | 8/2002 | Ball et al. | 707/511 |
| 2003/0004990 A1 | * | 1/2003 | Draper | 707/511 |
| 2003/0115547 A1 | * | 6/2003 | Ohwada et al. | 715/511 |
| 2004/0054967 A1 | * | 3/2004 | Brandenberger | 715/511 |
| 2004/0205539 A1 | * | 10/2004 | Mak et al. | 715/511 |

FOREIGN PATENT DOCUMENTS

EP    0 943 993 A    9/1999

OTHER PUBLICATIONS

Masslin, Henry, "A Lock-Free Multiprocessor OS Kernel," Jun. 19, 1991, [online], [retrieved from the Internet Apr. 22, 2004: http://citeseer.ist.psu.edu/massalin91lockfree.html], XP002277589.

* cited by examiner

*Primary Examiner*—Khanh B. Pham
(74) *Attorney, Agent, or Firm*—Fish & Richardson P.C.

(57) ABSTRACT

Methods and apparatus, including computer program products, for insuring data consistency within a network of computer systems. The method includes, in a network, sending a first data object from a first system to a second system, storing a copy of the first data object in the second system, generating a second data object from the first data object, sending the second data object and the copy to the first system, and determining a match of the copy with a current state of corresponding data of the copy in the first system.

23 Claims, 4 Drawing Sheets

O, A, B, C = representation of object data

O, A, B, C = representation of object data

CONFLICT DETECTION IN A DISTRIBUTED SYSTEM LANDSCAPE

TECHNICAL FIELD

The present invention relates to data processing by digital computer, and more particularly to conflict detection in a distributed system landscape.

BACKGROUND

In collaborative business processes, several different and separate computer based systems are typically involved, such as in Enterprise Resource Planning (ERP) systems. These systems communicate with each other using a network, forming a computer system landscape. Within such a system landscape data is exchanged between and replicated in the systems involved, and continual efforts are needed to maintain consistency of the data involved in long term transactions within the landscape.

SUMMARY

The present invention provides methods and apparatus, including computer program products, for conflict detection in a distributed system landscape.

In general, in one aspect, the invention features a method including, in a network, sending a first data object from a first system to a second system, storing a copy of the first data object in the second system, generating a second data object from the first data object, sending the second data object and the copy to the first system, and determining a match of the copy with a current state of corresponding data of the copy in the first system.

The invention can be implemented to include one or more of the following advantageous features.

The method can include accepting the second data object if the match is identical, rejecting the second data object if the match is not identical, or accepting the second data object if the match meets predetermined conditions. The predetermined conditions can include version identification, format information, context information, relationship information and/or identification information.

In general, in another aspect, the invention features a data consistency method including, in a network, sending a first data object from a first system to a second system, storing a copy of the first data object in the second system, generating a second data object from the first data object, sending the second data object and the copy to a third system, storing the copy in the third system, generating a third data object from the second data object, sending the third data object and the copy to the first system, and determining a match of the copy with a current state of corresponding data of the copy in the first system.

The invention can be implemented to include one or more of the following advantageous features.

The method can include accepting the third data object if the match is identical, rejecting the third data object if the match is not identical, or accepting the third data item if the match meets pre-determined conditions.

In general, in another aspect, the invention features a method including, in a network, sending a first data object from a first system to a second system, sending a second data object from a third system to the second system, storing a copy of the first data object and a copy of the second data object in the second system, generating, in the second system, a third data object from the first and second data object, sending the third data object and the copy of the first data object to the first system, and determining a match of the copy of the first data object with a current state of corresponding data of the copy in the first system.

The invention can be implemented to include one or more of the following advantageous features.

The method can include accepting the third data object if the match is identical, rejecting the third data object if the match is not identical, or accepting the third data item if the match meets pre-determined conditions.

The invention can be implemented to realize one or more of the following advantages.

The method provides automatic conflict resolution of data processed in long term transactions by disparate systems in a network, thus reducing manual intervention.

A source system sends complete data objects to a target system without knowledge of or restrictions to the target system. The target system maintains a copy of the received data object and can manipulate the received data object. The target system returns the changed data object and a copy of the original data object to the source system. The source system determines, using an inbound evaluation process, whether the returned copy of the original data objects matched a current state of that object in the source system. If there is a match, the source system may accept the changed object without the need for manual conflict resolution or data discard.

An owner/operator of data objects does not need to lock his data objects that are sent to a third party. The third party simply hands back the data objects together with a before image, that describes the state when they got the objects. When checking in the data, the owner/operator applies automatic consistency checks, which are available to all data objects. But the owner/operator can restrict precious resources of manual and advanced tool-based checks to the real critical objects, i.e., the ones that have changed with respect to their before image and specially the ones where the current status at the owner/operator is different from the before image that describes the object when it had been checked out. In these cases there is the highest risk that the modifications of the third party contradict to modifications the object has meanwhile undergone at the owner/operator's site.

The details of one or more implementations of the invention are set forth in the accompanying drawings and the description below. Further features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
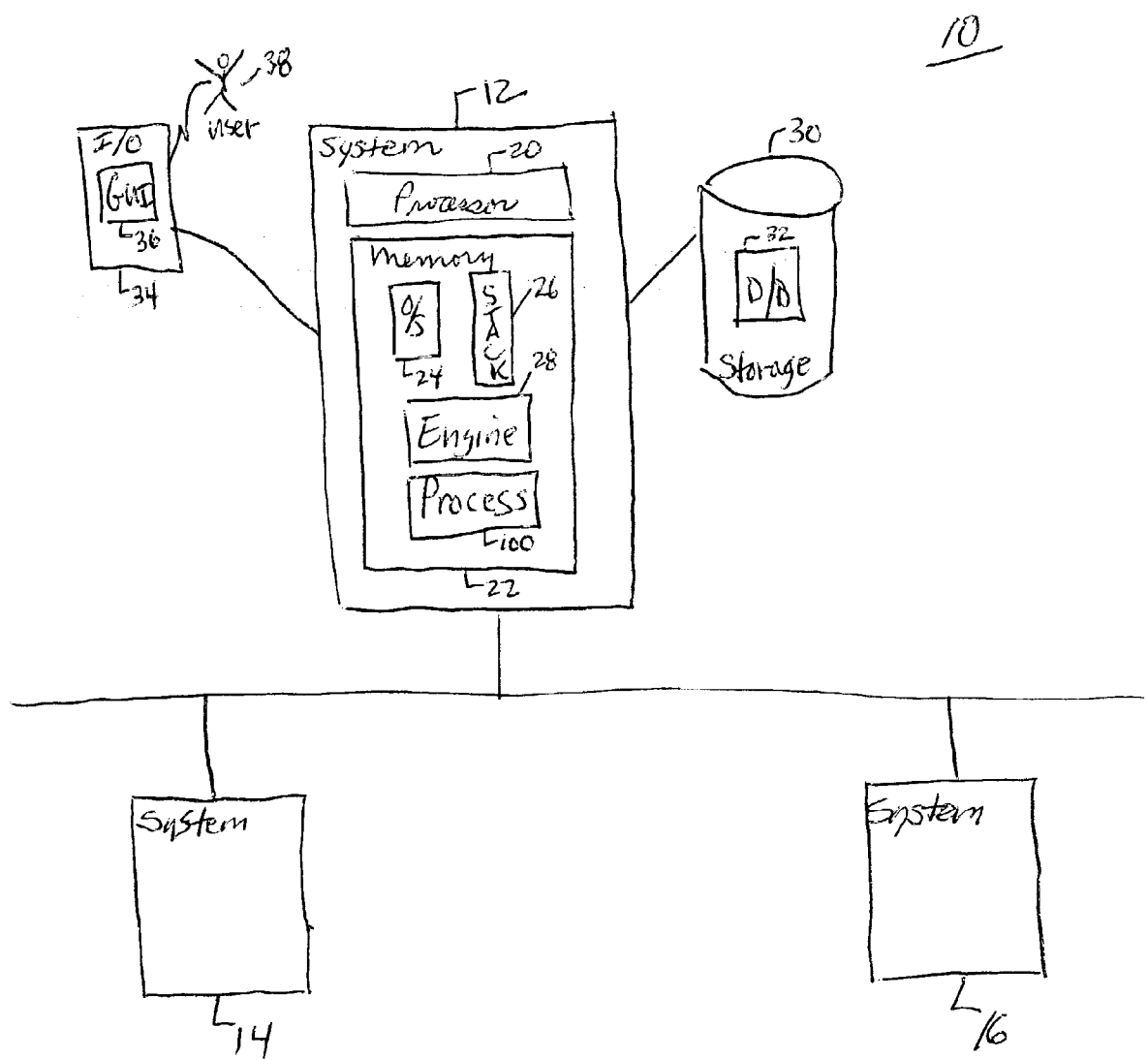
FIG. 1 is block diagram of a network.

In FIG. 1, an exemplary network 10, also referred to as a landscape, includes a number of collaborating systems 12, 14, 16. Each of the systems 12, 14, 16, system 12 for example, includes a processor 20 and a memory 22. Memory 22 stores an operating system 24, a stack 26 for communicating over the network 10, an engine 28 that works on data associated with a database through the execution of different types of applications, and a data conflict resolution process 100, described below.

Each of the systems 12, 14, 16, system 12 for example, includes a storage device 30 having a database 32 that can be, for example, maintained by a database management system. System 12 can also include an input/output (I/O) device 34 for display of a Graphical User Interface (GUI) 36 to a user 38.

The systems 12, 14, 16 can be of any type, such as Enterprise Resource Planning (ERP) systems, for example. In general, ERP is an industry term for a broad set of activities supported by multi-module application software that helps a manufacturer or other business manage important parts of its business, including product planning, parts purchasing, maintaining inventories, interacting with suppliers, providing customer service, and tracking orders. ERP can also include application modules for finance and human resources aspects of a business. Typically, an ERP system uses or is integrated with a database management system.

An example of an ERP system is the integrated business solution mySAP.com from SAP AG. In an ERP system, business processes are modeled in business objects. Instances of the business object are represented in data generated, stored and manipulated by the system. Typically, the systems that form part of the landscape each include a database, as discussed above, in which data related to instances of the business objects are stored.

Object data generally refers to a set of data representing any object, such as an asset, or part of an object, such as location data. Example object data are a document or part of a document, a data collection of attributes, references and/or links, or a set of data collections with a common consistency condition. Other object data examples include a pure structure representation, such as nodes and edges, and a complete structure including all of its elements, such as nodes, edges, linked or included data objects.

An object can be changed several times in a particular time period. Each data change generates a new (virtual) object state. In the description that follows we do not differ if the different object states can be visualized or if just the last object state is stored.

We also use the term "before image." The before image is, for example, a tuple (system identification, object state) representing an object at the beginning of a certain time period in a certain system.

Each of the systems 12, 14, 16 generates, maintains, utilizes and shares data within the landscape 10. In examples, systems 12, 14, 16 can change the same set of data at the same time or over long periods of time without knowledge of changes made by each other. This can result in difficulties during any distribution process since an object may look different to a last point of correspondence between two systems. In addition, changes can be overwritten and may lead to inconsistencies that necessitate staging, i.e., time consuming manual checking of the data or the discarding of the data.

Figure 2:
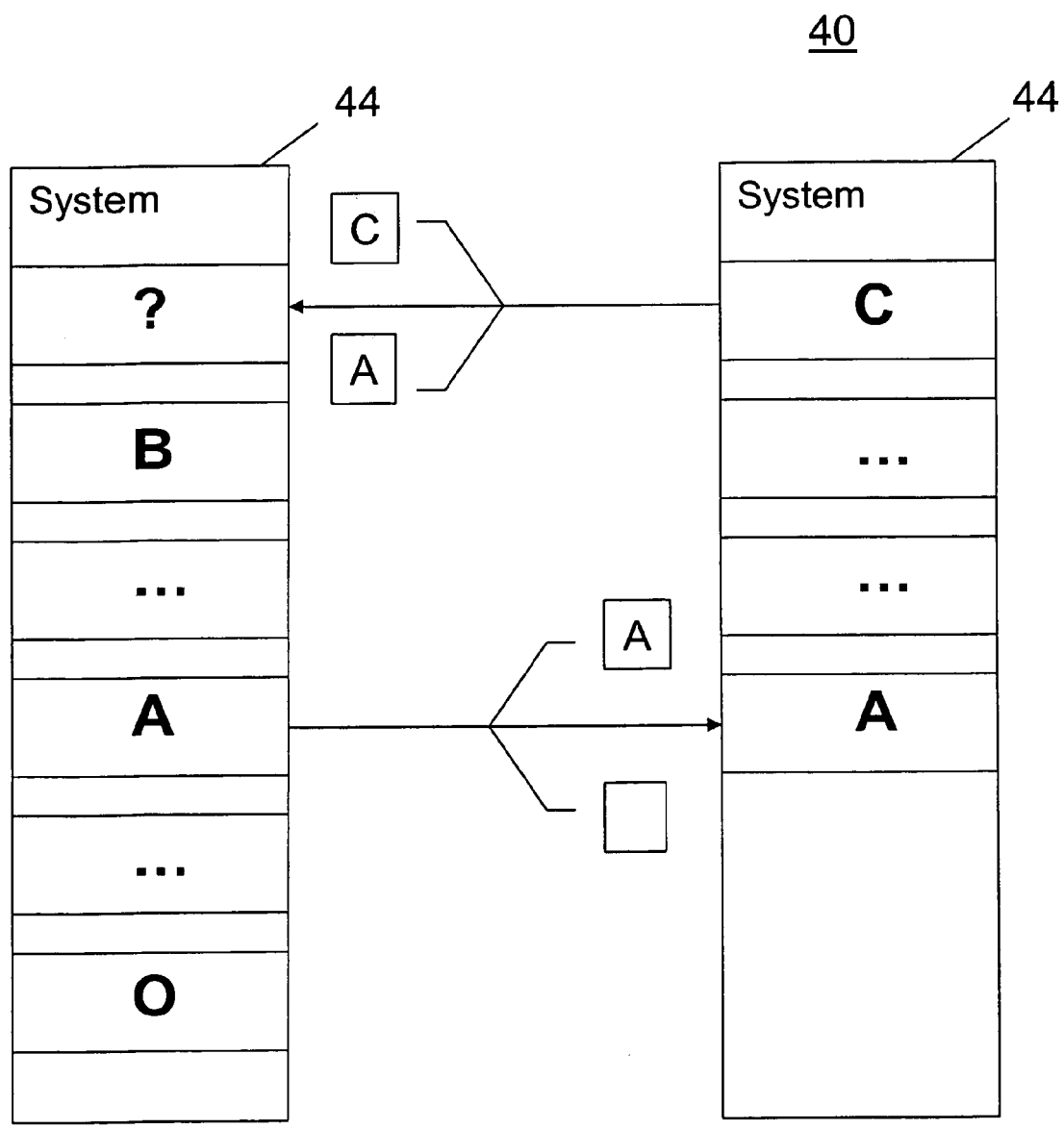
FIG. 2 is a block diagram of a two system landscape.

In FIG. 2, a two system landscape 40 includes a system 42 and a system 44. To avoid or minimize the above difficulties, system 42 identifies a piece of data A that is delivered to system 44, possibly in response to a request from system 44, at a time $t_0$. Upon receipt of data A from system 42, generally referred to as a before image A, system 44 makes a copy of the before image A. The before image A includes data and a context. The context can include several things, such as version number, format and relationship information. Processes and/or applications executed by an engine (not shown) in system 44 can manipulate, modify and/or change the data A received from system 42 to generate data C. During the same time interval that system 44 generates data C, system 42 can manipulate the data A by executing applications or processes in its engine, generating data B. When system 44 returns data C to system 42 it also returns before image A that was stored when first received from system 42. Data C includes a context. Upon receipt of data C and before image A, system 42 compares the received before image A with a current state of the corresponding data residing in system 42, i.e., data B. More specifically, system 42 executes a comparison between what was original data at $t_0$ and the current state of the corresponding data at time $t_1$.

If system 42 determines a match between the original data at $t_0$ (before image A) received from system 44 and a current state of the corresponding original data at $t_1$ (data B), system 42 can accept data C. If there is no match, system 42 can execute one or more actions, described below. One goal is to maintain data consistency in long term transactions.

A match can be defined in different ways. In one example, an acceptable match is defined as an identical match between the original data (e.g., before image A) and a current state of the corresponding data in system 42 (data B). In another example, an acceptable match is defined when the differences between the before image A and the current state of the corresponding data B in system 42 fall within an acceptable difference. An acceptable difference can be, for example, a difference in versions between the before image A and the current state of the corresponding data B in system 42. In another example, the data involved can contain subgroups and the subgroups can be independent or dependent. An acceptable difference can involve a comparison on which subgroups are affected and can be tolerated if changed.

If system 42 determines that there is not a match between the original data A at $t_0$ received from system 44 and a current state of the corresponding original data at $t_1$ (data B), as discussed above, one or more actions can be executed by system 42. In one example action, system 42 rejects the manipulated data C if there is no match between the original data (at $t_0$) received from system 44 and a current state of the corresponding original data (at $t_1$). In another example action, the system 42 determines whether a degree of non-matching characteristics is within a predetermined range so as to allow system 42 to accept the data C.

Figure 3:
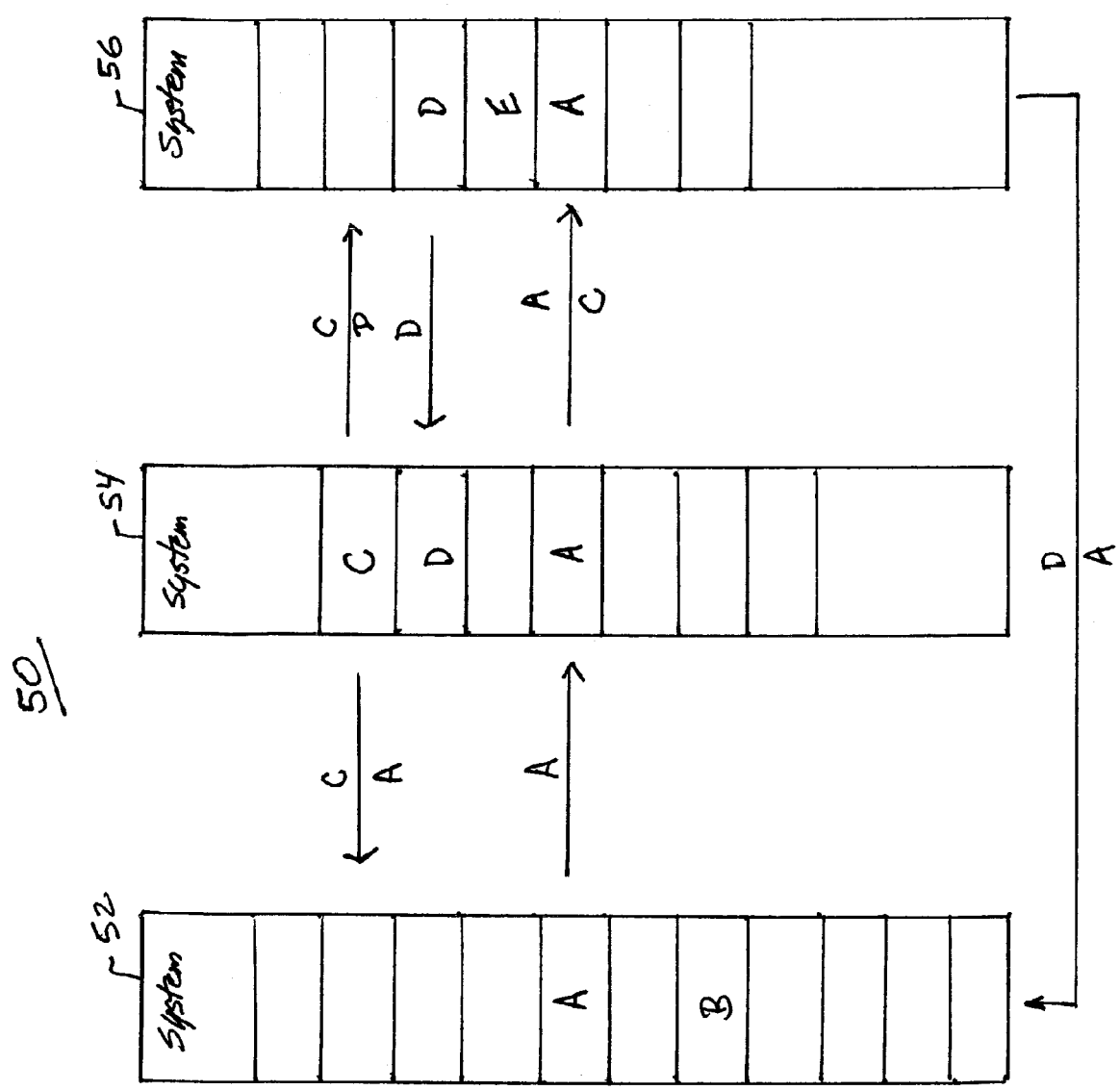
FIG. 3 is a block diagram of a multiple system landscape.

In FIG. 3, a three system landscape 50 includes systems 52, 54, 56. System 52 sends data A, referred to a before image A for convenience, to system 54. System 56 sends data, referred to as before image D for convenience, to system 54. System 54 makes a copy of the before image A and a copy of before image D and stores them. As time progresses, system 52 generates data B from data A. System 56 generates data E from data D. System 54 generates data C from data A and data D.

If system 54 returns data C to system 56 it also returns before image D and compares before image D with a current state of the corresponding data, i.e., data E, as described above. If before image D matches data E, data C is accepted by system 56.

If system 54 returns data C to system 52 it also returns before image A and compares before image A with a current state of the corresponding data, i.e., data B, as described above. If before image A matches data B, data C is accepted by system 52. Data C was generated as a result of system 54's processing of input from both system 52 and system 56.

In another example, system 52 generates and sends before image A to system 54. System 54 stores a copy of before image A before processing before image A to generate data C. System 54 sends data C and its copy of before image A to system 56. System 56 stores a copy of before image A before processing data C to generate data D. System 56 returns data D and its copy of before image A to system 52. As described above, system 52 determines whether there is a match between before image A and a current state of a corresponding representation of data, i.e., data B. If before image A and data B match, then system 52 can accept data D.

In a variation of the above example, System 52 stores a local copy of before image A. System 54 sends data C and a first delta data item to system 56, the delta data item including a difference between before image A and data C. When system 56 returns data D to system 52, system 56 sends the first delta data item and a second delta data item, the second delta data item including a difference between data D and the first delta data item. System 52 compares the sum of before image A, first delta data item and second delta data item with data B. If a match is discovered, system 52 can accept data D.

An object of each of the above examples is to insure data consistency in long term transactions by determining whether conflicts can be managed automatically rather than manually through staging. In an example, this automatic conflict resolution can be implemented as a rules-based system.

Figure 4:
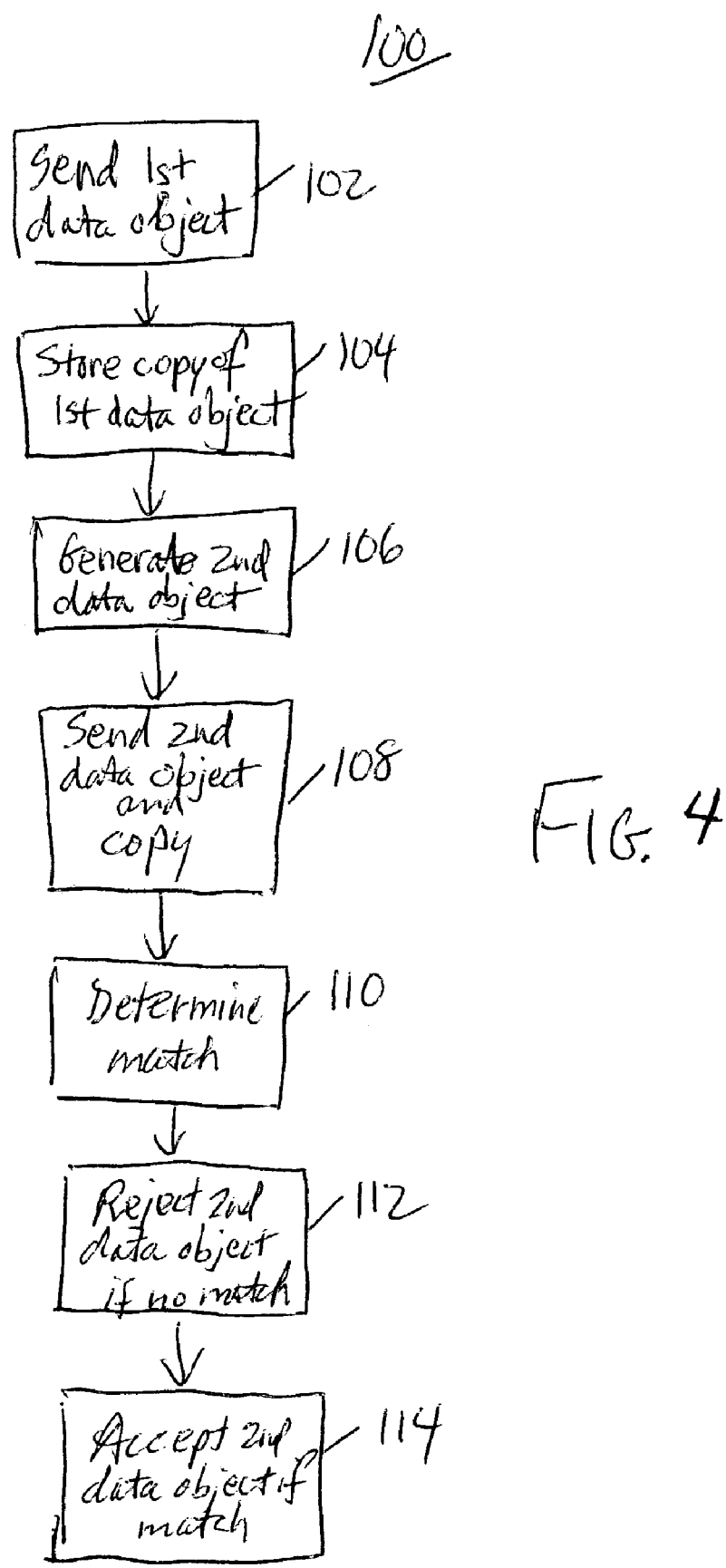
FIG. 4 is a flow diagram of a conflict detection process.

In FIG. 4, the data conflicts resolution process 100 includes sending (102) a first data object from a first system to a second system. The process 100 stores (104) a copy of the first data object in the second system and generates (106) a second data object from the first data object. The process 100 sends (108) the second data object and the copy to the first system and determines (110) a match of the copy with a current state of corresponding data of the copy in the first system. The process 100 rejects (112) the second data object if there is no match and accepts (114) the second data object if the match is identical or meets pre-determined conditions.

The invention has been described above indicating where copies of data are created or stored. Other configurations are possible. For example, rather than receiving systems making copies of received data, the sending systems can make, store or send such copies. The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims.

What is claimed is:

1. A method for maintaining data consistency comprising:
    sending a first data object from a first system to a second system;
    storing the first data object in the second system;
    generating, in the second system, a second data object from the first data object;
    sending the second data object and the first data object from the second system to the first system, wherein sending comprises always sending complete copies of the first data object and the second data object to the first system;
    determining, in the first system, whether the first data object received from the second system at least partly matches a current version of the first data object on the first system; and
    accepting the second data object if there is an identical match between the first data object received from the second system and the current version of the first data object on the first system.

2. The method of claim 1, further comprising:
rejecting the second data object if there is not an identical match between the first data object received from the second system and the current version of the first data object on the first system.

3. The method of claim 1, further comprising:
accepting the second data object if a match between the first data object received from the second system object and the current version of the first data object on the first system meets one or more predetermined conditions.

4. The method of claim 3, wherein the one or more predetermined conditions comprise the first data object received from the second system and the current version of the first data object on the first system having at least some same version identification information.

5. The method of claim 3, wherein the one or more predetermined conditions comprise the first data object received from the second system and the current version of the first data object on the first system having at least some same format information.

6. The method of claim 3, wherein the one or more predetermined conditions comprise the first data object received from the second system and the current version of the first data object on the first system having at least some same context information.

7. The method of claim 3, wherein the one or more predetermined conditions comprise the first data object received from the second system and the current version of the first data object on the first system having a predefined relationship.

8. The method of claim 3, wherein the one or more predetermined conditions comprise the first data object received from the second system and the current version of the first data object on the first system having at least some same identification information.

9. A method for maintaining data consistency comprising:
sending a first data object from a first system to a second system;
storing the first data object in the second system;
generating, in the second system, a second data object from the first data object;
sending the second data object and the first data object from the second system to a third system;
storing the first data object in the third system;
generating, in the third system, a third data object from the second data object;
sending the third data object and the first data object from the third system to the first system, wherein sending comprise always sending complete copies of the first data object and the third data object to the first system;
determining, in the first system, whether the first data object received from the third system at least partly matches a current version of the first data object on the first system; and
accepting the third data object if there is an identical match between the first data object received from the third system and the current version of the first data object on the first system.

10. The method of claim 9, further comprising:
rejecting the third data object if there is not an identical match between the first data object received from the third system and the current version of the first data object on the first system.

11. The method of claim 9, further comprising:
accepting the third data object if a match between the first data object received from the third system and the current version of the first data object on the first system meets one or more predetermined conditions.

12. A method for maintaining data consistency comprising:
sending a first data object from a first system to a second system;
sending a second data object from a third system to the second system;
storing, in the second system, the first data object and the second data object;
generating, in the second system, a third data object from the first data object and the second data object;
sending the third data object and the first data object from the second system to the first system, wherein sending comprises always sending complete copies of the first data object and the third data object to the first system;
determining, in the first system, whether the first data object received from the second system at least partly matches a current version of the first data object on the first system; and
accepting the third data object if there is an identical match between the first data object received from the second system and the current version of the first data object on the first system.

13. The method of claim 12, further comprising:
rejecting the third data object if there is not an identical match between the first data object received from the second system and the current version of the first data object on the first system.

14. The method of claim 12, further comprising accepting the third data object if a match between the first data object received from the second system and the current version of the first data object on the first system meets one or more predetermined conditions.

15. A computer program product, tangibly embodied in one or more machine-readable storage media, for maintaining data consistency, the computer program product being operable to cause one or more data processing apparatus to:
send a first data object from a first system to a second system;
receive, from the second system, the first data object and a second data object, the second data object being derived based on the first data object, wherein receiving comprises always receiving complete copies of the first data object and the second data object from the second system;
determine whether the first data object received from the second system at least partly matches a current version of the first data object on the first system; and
accept the second data object if there is an identical match between the first data object received from the second system and the current version of the first data object on the first system.

16. The computer program product of claim 15, further comprising instructions to:
accept the second data object if a match between the first data object received from the second system and the current version of the first data object on the first system meets one or more predetermined conditions.

17. The computer program product of claim 15, further comprising instructions to:
reject the second data object if there is not an identical match between the first data object received from the second system and the current version of the first data object on the first system.

18. A computer program product, tangible embodied in one or more machine-readable storage media, for maintaining data consistency, the computer program product being operable to cause one or more data processing apparatus to:

send a first data object from a first system to a second system, the second system generating a second data object from the first data object, the second system sending the second data object and the first data object to a third system, the third system generating a third data object from the second data object;

receive, from the third system, the third data object and the first data object, wherein receiving comprises always receiving complete copies of the first data object and the third data object from the third system;

determine whether the first data object received from the third system at least partly matches a current version of the first data object on the first system; and accept the third data object if there is an identical match between the first data object received from the third system and the current version of the first data object on the first system.

19. The computer program product of claim 18, further comprising instructions to:

accept the third data object if a match between the first data object received from the third system and the current version of the first data object on the first system meets one or more pre-determined conditions.

20. The computer program product of claim 18, further comprising instructions to:

reject the third data object if there is not an identical match between the first data object received from the third system and the current version of the first data object on the first system.

21. A computer program product, tangibly embodied in one or more machine-readable storage media, for maintaining data consistency, the computer program product being operable to cause one or more data processing apparatus to:

send a first data object from a first system to a second system, the second system receiving a second data object from a third system and generating a third data object from the first data object and the second data object;

receive the third data object and the first data object from the second system, wherein receiving comprises always receiving complete copies of the first data object and the third data object from the second system;

determine whether the first data object received from the second system at least partly matches a current version of the first data object on the first system; and accept the third data object if there is an identical match between the first data object received from the second system and the current version of the first data object on the first system.

22. The computer program product of claim 21, further comprising instructions to:

accept the third data object if a match between the first data object received from the second system and the current version of the first data object on the first system meets one or more pre-determined conditions.

23. The computer program product of claim 21, further comprising instructions to:

reject the third data object if there is not an identical match between the first data object received from the second system and the current version of the first data object on the first system.

* * * * *